(12) United States Patent
Matsumoto (10) Patent No.: US 10,396,632 B2
(45) Date of Patent: Aug. 27, 2019

(54) STATOR FOR ROTARY ELECTRIC MACHINE HAVING INTEGRALLY MOLDED TEMPERATURE SENSOR

(71) Applicant: TOYOTA JIDOSHA KABUSHIKI KAISHA, Toyota-shi, Aichi-ken (JP)

(72) Inventor: Takashi Matsumoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 76 days.

(21) Appl. No.: 15/118,611

(22) PCT Filed: Feb. 10, 2015

(86) PCT No.: PCT/IB2015/000128
§ 371 (c)(1),
(2) Date: Aug. 12, 2016

(87) PCT Pub. No.: WO2015/121732
PCT Pub. Date: Aug. 20, 2015

(65) Prior Publication Data
US 2017/0054346 A1    Feb. 23, 2017

(30) Foreign Application Priority Data

Feb. 13, 2014   (JP) ................................. 2014-025814

(51) Int. Cl.
*H02K 9/24*   (2006.01)
*H02K 9/19*   (2006.01)
(Continued)

(52) U.S. Cl.
CPC ............... *H02K 9/24* (2013.01); *H02K 1/146* (2013.01); *H02K 3/18* (2013.01); *H02K 9/19* (2013.01); *H02K 11/25* (2016.01); *H02K 15/12* (2013.01)

(58) Field of Classification Search
CPC .. H02K 3/18; H02K 5/18; H02K 5/20; H02K 9/06; H02K 9/19; H02K 9/24; H02K 11/25; H02K 15/12; F04D 29/5806
(Continued)

(56) References Cited

U.S. PATENT DOCUMENTS 3,353,042 A * 11/1967 Baumann ................. H02K 9/14
310/57
3,606,792 A *  9/1971 Yoshimoto ............... G01K 1/08
374/155
(Continued)

FOREIGN PATENT DOCUMENTS

CN   102239624 A   11/2011
CN   103066715 A    4/2013
(Continued)

*Primary Examiner* — Bernard Rojas
*Assistant Examiner* — Rashad H Johnson
(74) *Attorney, Agent, or Firm* — Hunton Andrews Kurth LLP (57) ABSTRACT

A cooling oil is supplied from a cooling pipe to an outer peripheral surface of a mold resin, and a thermistor for measuring a temperature of a coil is provided at one end portion of the mold resin in an axial direction of a stator. A bulge portion for restraining the cooling oil from being supplied to the thermistor is provided bulging outward in the axial direction of the stator in such a manner as to surround at least part of a periphery of the thermistor, at one end portion of the mold resin in the axial direction of the stator.

6 Claims, 6 Drawing Sheets

(51) Int. Cl.
  *H02K 11/25* (2016.01)
  *H02K 1/14* (2006.01)
  *H02K 3/18* (2006.01)
  *H02K 15/12* (2006.01)

(58) Field of Classification Search
  USPC .......................................... 310/62, 63, 64, 89
  See application file for complete search history.

(56) References Cited

U.S. PATENT DOCUMENTS

| | | | | |
|---|---|---|---|---|
| 4,112,405 A * | 9/1978 | Joseph | ................. | H01F 27/402 310/68 C |
| 4,742,257 A * | 5/1988 | Carpenter | ................ | H02K 9/14 310/57 |
| 5,367,282 A * | 11/1994 | Clem | ...................... | G01K 1/08 338/22 R |
| 5,763,969 A * | 6/1998 | Metheny | .................. | H02K 9/14 310/52 |
| 6,502,774 B1 * | 1/2003 | Johansson | ................. | B02C 7/02 241/261.2 |
| 9,608,499 B2 * | 3/2017 | Bessho | ................ | H02K 11/25 |
| 9,772,234 B2 * | 9/2017 | Suzuki | ..................... | G01K 7/22 |
| 9,831,749 B2 * | 11/2017 | Hoshina | ................. | H02K 3/28 |
| 9,885,276 B2 * | 2/2018 | Shieh | .................... | F04D 25/0666 |
| 2001/0011854 A1 * | 8/2001 | Heyden | ................. | H02K 3/522 310/254.1 |
| 2006/0017335 A1 * | 1/2006 | Matin | ..................... | H02K 9/20 310/57 |
| 2006/0239332 A1 * | 10/2006 | Harr | ......................... | G01J 5/02 374/208 |
| 2007/0252454 A1 * | 11/2007 | Hayashi | ................ | H02K 3/522 310/71 |
| 2007/0278869 A1 * | 12/2007 | Taketsuna | ............... | H02K 3/24 310/54 |
| 2008/0001486 A1 * | 1/2008 | Smith | ..................... | H02K 9/04 310/52 |
| 2009/0016879 A1 * | 1/2009 | Chen | ...................... | F04D 17/16 415/220 |
| 2009/0091211 A1 * | 4/2009 | Huan | ..................... | H02K 13/006 310/265 |
| 2009/0140614 A1 * | 6/2009 | Heim | ..................... | H02K 11/25 310/68 C |
| 2009/0232185 A1 * | 9/2009 | Sasaki | ................... | G01K 1/14 374/208 |
| 2010/0033040 A1 | 2/2010 | Wakita | | |
| 2010/0196174 A1 * | 8/2010 | Lee | ..................... | F04D 25/0606 417/410.1 |
| 2011/0285218 A1 * | 11/2011 | Tsubakimoto | ........ | H02K 13/006 310/50 |
| 2011/0285220 A1 * | 11/2011 | Sonohara | ............... | H02K 5/225 310/53 |
| 2012/0111145 A1 * | 5/2012 | Maekawa | ............... | H02K 3/522 74/665 A |
| 2012/0112580 A1 * | 5/2012 | Sato | ...................... | H02K 3/522 310/71 |
| 2013/0099606 A1 | 4/2013 | Inoue et al. | | |
| 2013/0162243 A1 * | 6/2013 | Ochiai | ................. | G01D 5/2046 324/207.16 |
| 2014/0184031 A1 * | 7/2014 | Kaneshige | ............ | H02K 11/25 310/68 B |
| 2014/0217858 A1 * | 8/2014 | Haruno | ................. | H02K 5/225 310/68 C |
| 2015/0078418 A1 * | 3/2015 | Suzuki | .................... | G01K 7/22 374/152 |
| 2015/0155760 A1 * | 6/2015 | Bessho | ................. | H02K 11/25 310/68 C |
| 2015/0349611 A1 * | 12/2015 | Hino | ...................... | H02K 3/522 310/68 C |
| 2015/0354552 A1 * | 12/2015 | Inagaki | .............. | F04B 39/0005 417/415 |
| 2015/0357885 A1 * | 12/2015 | Koiwai | ................. | H02K 11/25 310/68 C |
| 2016/0025096 A1 * | 1/2016 | Shi | ...................... | F04D 27/0292 417/423.1 |
| 2016/0084546 A1 * | 3/2016 | Yokoyama | ............... | F25B 1/02 62/324.6 |
| 2016/0094102 A1 * | 3/2016 | Hoshina | ................ | H02K 3/28 310/71 |
| 2017/0019000 A1 * | 1/2017 | Sakamoto | ................ | G01K 1/14 |
| 2017/0054346 A1 * | 2/2017 | Matsumoto | ............. | H02K 9/19 |
| 2017/0070125 A1 * | 3/2017 | Bei | ..................... | H02K 21/22 |
| 2017/0288490 A1 * | 10/2017 | Tamura | ................. | F16H 57/027 |
| 2017/0328269 A1 * | 11/2017 | Yamashita | ............... | F01P 3/20 |

FOREIGN PATENT DOCUMENTS

| | | |
|---|---|---|
| JP | 2005-012961 A | 1/2005 |
| JP | 2010-045892 A | 2/2010 |
| JP | 2010-141968 A | 6/2010 |
| JP | 2010-252508 A | 11/2010 |

* cited by examiner

STATOR FOR ROTARY ELECTRIC MACHINE HAVING INTEGRALLY MOLDED TEMPERATURE SENSOR

CROSS-REFERENCE TO RELATED APPLICATIONS

This is a national phase application based on the PCT International Patent Application No. PCT/162015/000128 filed Feb. 10, 2015, claiming priority to Japanese Patent Application No. 2014-025814 filed Feb. 13, 2014, the entire contents of both of which are incorporated herein by reference.

BACKGROUND OF THE INVENTION

1. Field of the Invention

The invention relates to a stator for a rotary electric machine, and more particularly, to a stator that is provided with a temperature sensor for measuring a temperature of a coil.

2. Description of Related Art

In a stator for a rotary electric machine disclosed in Japanese Patent Application Publication No. 2010-141968 (JP-2010-141968 A), with a view to measuring a temperature of a coil, a thermistor (a temperature sensor) is inserted from a position on an outer peripheral surface of a resin-molded coil end portion, and is fixed. In order to restrain a cooling oil (a liquid cooling medium) supplied to an outer peripheral surface of mold resin from falling on the thermistor, a terminal block of the rotary electric machine installed on the outer peripheral surface of the coil end portion is provided with an oil inflow restraint member, so as to cover the thermistor.

If the liquid cooling medium is supplied to the temperature sensor when the temperature of the coil is measured by the temperature sensor, the temperature sensor may measure the temperature of the liquid cooling medium instead of the temperature of the coil, so the accuracy in measuring the temperature of the coil tends to decrease. In Japanese Patent Application Publication No. 2010-141968 (JP-2010-141968 A), with a view to restraining the liquid cooling medium from being supplied to the thermistor, the oil inflow restraint member needs to be provided separately on the terminal block of the rotary electric machine, so the size of the stator tends to increase.

SUMMARY OF THE INVENTION

In view of the aforementioned problem, the invention provides a stator for a rotary electric machine that restrains a liquid cooling medium from being supplied to a temperature sensor for measuring a temperature of a coil, while suppressing an increase in the size of the stator.

Thus, according to one aspect of the invention, there is provided a stator for a rotary electric machine that is equipped with a stator core, a coil, a mold portion, and a temperature sensor. The coil is wound around the stator core. The mold portion includes a coil end portion, the coil end portion projecting outward from the stator core of the coil in an axial direction of the stator. A bulge portion is provided at an end portion of the mold portion in the axial direction of the stator. Then, the mold portion is configured to mold the coil end portion. A liquid cooling medium is supplied from a cooling medium supply member to an outer peripheral surface of the mold portion. The temperature sensor is provided at the end portion of the mold portion in the axial direction of the stator. The temperature sensor is configured to measure a temperature of the coil. Then, the bulge portion is provided bulging outward in the axial direction of the stator to surround at least part of a periphery of the temperature sensor. The bulge portion is configured to restrain the liquid cooling medium from being supplied to the temperature sensor.

Besides, in the stator for the rotary electric machine, the temperature sensor may include an element portion at a tip portion of the temperature sensor, and the element portion may be located inside an end surface of the mold portion in the axial direction of the stator.

Besides, in the stator for the rotary electric machine, the temperature sensor may include an element portion at a tip portion of the temperature sensor, and the element portion may be located outside an end surface of the mold portion in the axial direction of the stator.

Besides, in the stator for the rotary electric machine, the temperature sensor may include an element portion at a tip portion of the temperature sensor. The element portion may be located vertically above a central axis of the stator.

Besides, in the stator for the rotary electric machine, the temperature sensor may include an element portion at a tip portion of the temperature sensor, and the element portion may be located vertically below a central axis of the stator.

Besides, in the stator for the rotary electric machine, the bulge portion may be molded integrally with the mold portion.

Besides, in the stator for the rotary electric machine, the bulge portion may be molded separately from the mold portion, and the bulge portion may be bonded to the mold portion.

Furthermore, in the stator for the rotary electric machine, the stator core may include a plurality of teeth that are arranged apart from one another in a circumferential direction of the stator, the coil may be wound around each of the teeth of the stator core in a concentrated manner, and a position of the temperature sensor in the circumferential direction of the stator may be equivalent to a position between the coils that are adjacent to each other in the circumferential direction of the stator.

According to the stator for the rotary electric machine as described above, the bulge portion that bulges outward in the axial direction of the stator in such a manner as to surround at least part of the periphery of the temperature sensor is provided at the end portion of the mold portion in the axial direction of the stator. Therefore, the liquid cooling medium can be restrained from being supplied to the temperature sensor for measuring the temperature of the coil. Accordingly, there is no need to provide the oil inflow restraint member separately on the rotary electric machine, so the size of the stator can be restrained from increasing.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

A mode for carrying out the invention (hereinafter referred to as an embodiment of the invention) will be described hereinafter with reference to the drawings.

Figure 1:
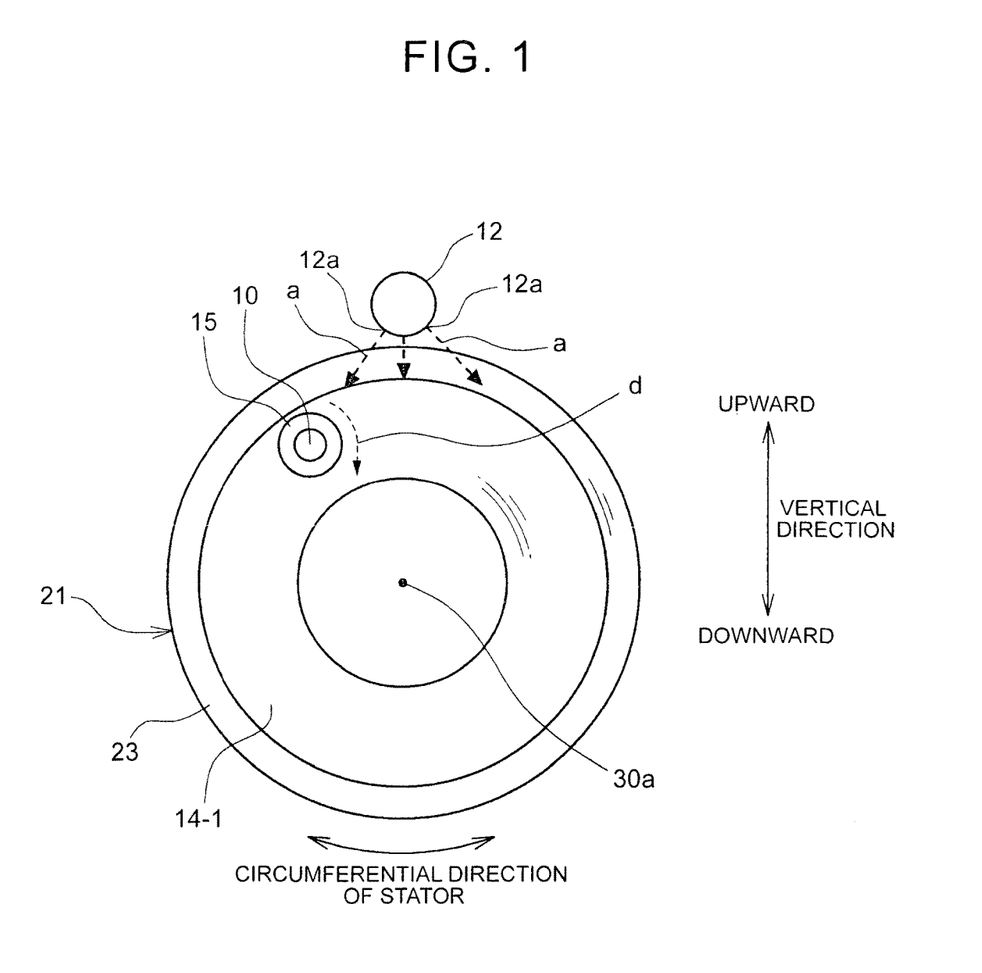
FIG. 1 is a view showing a schematic configuration as viewed from an axial direction of a stator for a rotary electric machine according to the embodiment of the invention.
Figure 2:
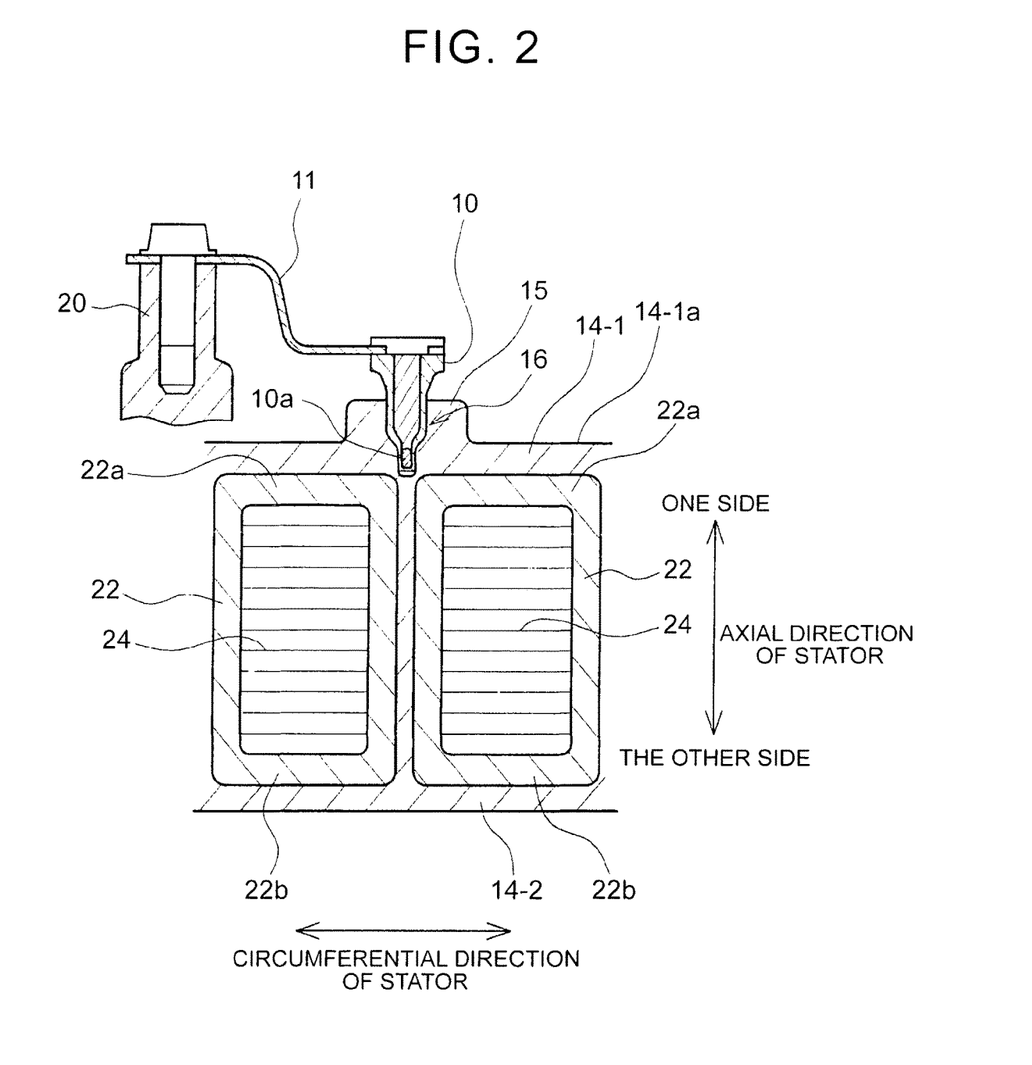
FIG. 2 is a cross-sectional view showing a schematic configuration along a circumferential direction of the stator for the rotary electric machine according to the embodiment of the invention.
Figure 3:
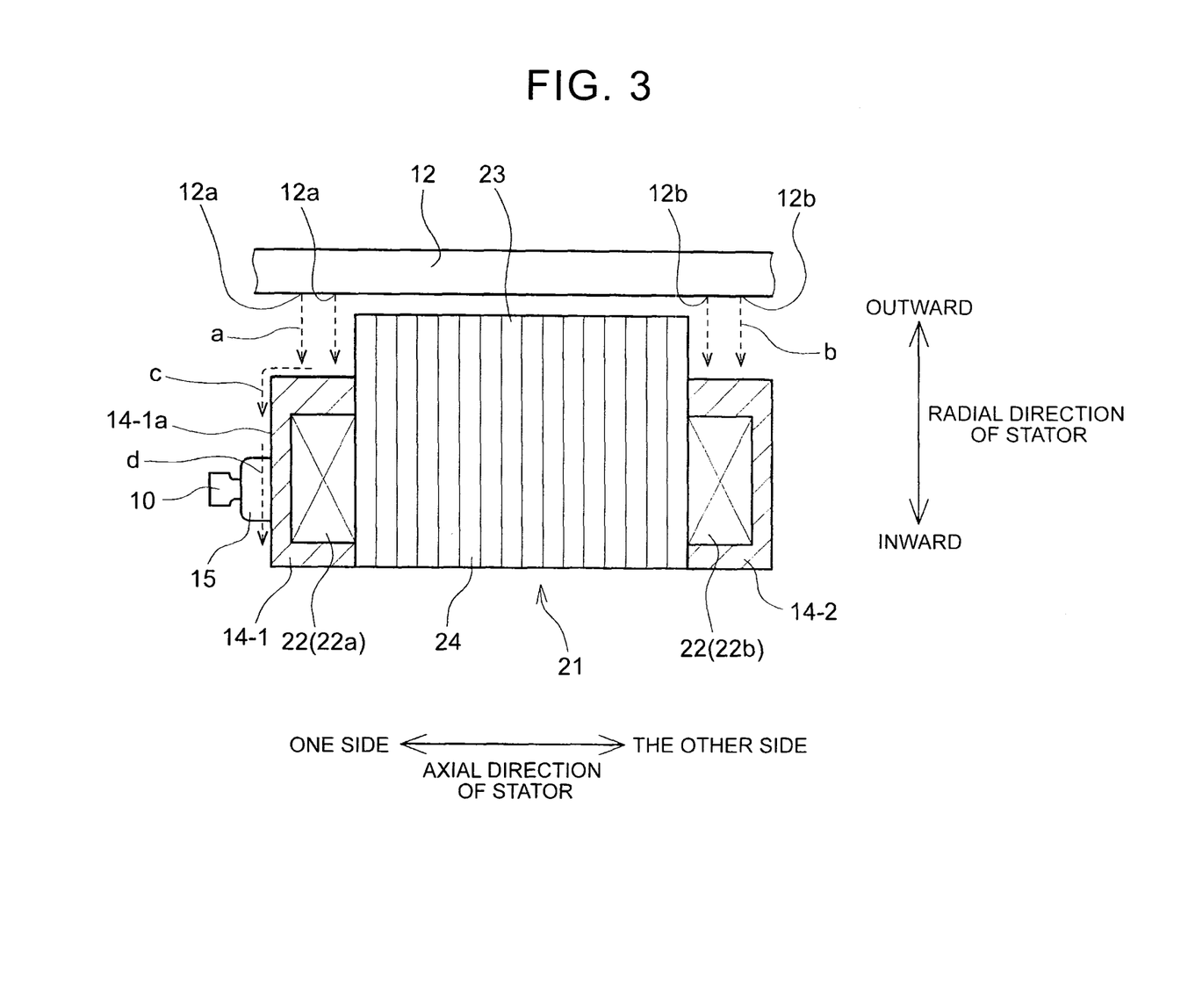
FIG. 3 is a cross-sectional view showing a schematic configuration as viewed from a direction perpendicular to the axial direction of the stator for the rotary electric machine according to the embodiment of the invention.
Figure 4:
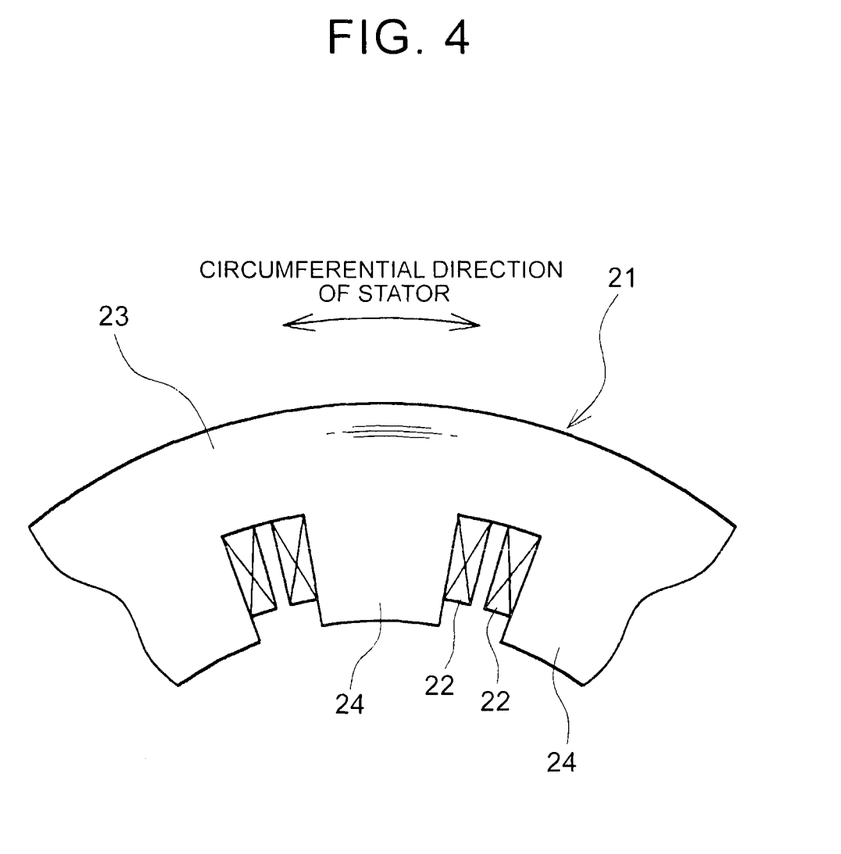
FIG. 4 is a view showing a configurational example of a stator core and a coil as viewed from the axial direction of the stator for the rotary electric machine according to the embodiment of the invention.

Each of FIGS. 1 to 4 is a view showing a schematic configuration of a stator for a rotary electric machine according to the embodiment of the invention. FIG. 1 shows the schematic configuration as viewed from an axial direction of the stator. FIG. 2 shows a cross-section along a circumferential direction of the stator. FIG. 3 shows a cross-section as viewed from a direction perpendicular to the axial direction of the stator. FIG. 4 shows a configurational example of a stator core 21 and coils 22. FIG. 4 shows part of the configuration of the stator core 21 and the coils 22 as to the circumferential direction of the stator, but the configuration of the remaining part (not shown) is identical in configuration to the part shown in the drawing.

The stator is configured to include the stator core 21, and the coils 22 that are wound around the stator core 21, and is fixed to a housing 20. The stator core 21 has an annular yoke 23 that extends along a circumferential direction of the stator, and a plurality of teeth 24 that protrude inward (toward a rotor (not shown) side) from an inner peripheral surface of the yoke 23 in a radial direction of the stator. The plurality of the teeth 24 are arranged apart from one another (at equal intervals) in the circumferential direction of the stator, and the coils 22 are wound around the teeth 24 respectively. In an example of FIGS. 2 and 4, the coils 22 are wound around the teeth 24 respectively in a concentrated manner. Each of the coils 22 has coil end portions 22a and 22b that project outward from the stator core 21 (a corresponding one of the teeth 24) in the axial direction of the stator (toward one side and the other side in the axial direction of the stator). It is preferable that the stator (the stator core 21) be arranged, for example, such that the axial direction of the stator is perpendicular to (or substantially perpendicular to) the vertical direction. However, the axial direction of the stator may be slightly inclined with respect to the horizontal direction.

In the stator, with a view to fixing the coils 22 to the stator core 21, mold resins (mold portions) 14-1 and 14-2 are provided at both end portions respectively in the axial direction of the stator. The mold resins 14-1 and 14-2 are tightly provided in such a manner as to cover the coil end portions 22a and 22b and parts of both end surfaces of the yoke 23 in the axial direction thereof (inner peripheral regions), thereby molding (sealing) the coil end portions 22a and 22b. As the mold resins 14-1 and 14-2, for example, a thermosetting resin can be used.

A cooling pipe 12 as a cooling medium supply member is arranged vertically above (directly above) a vertically top position on an outer peripheral surface of the stator. In the cooling pipe 12, cooling medium discharge ports 12a are formed vertically above (directly above) a vertically top position of an outer peripheral surface of the mold resin 14-1, and cooling medium discharge ports 12b are formed vertically above (directly above) a vertically top position of an outer peripheral surface of the mold resin 14-2. As indicated by arrows a of FIGS. 1 and 3, a cooling oil as a liquid cooling medium is supplied from the cooling medium discharge ports 12a of the cooling pipe 12 to the outer peripheral surface of the mold resin 14-1. As indicated by arrows b of FIG. 3, the cooling oil is supplied from the cooling medium discharge ports 12b of the cooling pipe 12 to the outer peripheral surface of the mold resin 14-2. The cooling oil is urged to flow vertically downward by the gravity, and flows in the circumferential direction of the stator along the outer peripheral surfaces of the mold resins 14-1 and 14-2. Thus, the coil end portions 22a and 22b that are resin-molded by the mold resins 14-1 and 14-2 are cooled.

In order to measure the temperature of the coils 22, a thermistor 10 as a temperature sensor is provided at one end portion (an outer end portion) of the mold resin 14-1 in the axial direction of the stator. In an example of FIG. 1, the thermistor 10 is arranged at a position vertically above a central axis 30a of the stator. In the present embodiment of the invention, a bulge portion 15 for restraining the cooling oil from being supplied to the thermistor 10 is provided bulging outward in the axial direction of the stator in such a manner as to surround part of the periphery of the thermistor 10, at one end portion (the outer end portion) of the mold resin 14-1 in the axial direction of the stator. In an example of FIG. 2, an insertion hole 16 that opens to one end surface in the axial direction of the stator is formed in the mold resin 14-1, and a tip portion of the thermistor 10 is inserted in the insertion hole 16. The bulge portion 15 bulges toward one side in the axial direction of the stator from one end surface (a region other than the bulge portion 15) 14-1a of the mold resin 14-1 in the axial direction of the stator, in such a manner as to surround the entire periphery of the thermistor 10. The insertion hole 16 is formed extending in the axial direction of the stator to a position close to each of the coils 22 (each of the coil end portions 22a). An element portion (a temperature measurement portion) 10a at the tip portion of the thermistor 10 inserted in the insertion hole 16 is arranged close to the coil end portion 22a. The position of the thermistor 10 in the circumferential direction of the stator is equivalent to a position between the coils 22 that are adjacent to each other in the circumferential direction of the stator. In the example of FIG. 2, the element portion 10a at the tip portion of the thermistor 10 is opposed to the position between the coils 22 (the coil end portions 22a) that are adjacent to each other in the circumferential direction of the stator, in the axial direction of the stator. The element portion 10a is located inside one end surface in the axial direction of the stator (a region other than the bulge portion 15) 14-1a in the axial direction of the stator (i.e., on the other side in the axial direction of the stator). A bracket 11 is attached to a root portion of the thermistor 10. The bracket 11 is fixed to the housing 20, so the thermistor 10 is fixed to the housing 20. As the bulge portion 15, for example, a thermosetting resin can be used as is the case with the mold resin 14-1. The bulge portion 15 can be molded integrally with the mold resin 14-1.

The cooling oil supplied from the cooling medium discharge ports 12a of the cooling pipe 12 to the mold resin 14-1 not only flows in the circumferential direction of the stator along the outer peripheral surface of the mold resin 14-1 but also flows vertically downward along one end surface 14-1a of the mold resin 14-1 in the axial direction of the stator as indicated by an arrow c of FIG. 3. If the cooling oil that flows along one end surface 14-1a of the mold resin 14-1 in the axial direction of the stator falls on the thermistor 10 or flows into the gap between the thermistor 10 and the mold resin 14-1 (the inner peripheral surface of the insertion hole 16) when the temperature of the coils 22 is measured by the thermistor 10, the thermistor 10 may measure the temperature of the cooling oil instead of the temperature of the coils 22 (the coil end portions 22a), so the accuracy in measuring the temperature of the coils 22 tends to decrease. In contrast, according to the present embodiment of the invention, the cooling oil flows vertically downward along the outer peripheral surface of the bulge portion 15 as indicated by an arrow d of FIGS. 1 and 3, so the bulge portion 15 can restrain the cooling oil from falling on the thermistor 10 or flowing into the gap between the thermistor 10 and the mold resin 14-1 (the inner peripheral surface of the insertion hole 16). Accordingly, the accuracy in measuring the temperature of the coils 22 by the thermistor 10 can be enhanced. In this case, the shape of one end portion of the mold resin 14-1 in the axial direction of the stator is devised to provide the bulge portion 15 around the thermistor 10. Thus, the cooling oil can be restrained from being supplied to the thermistor 10, without separately providing a member for covering the periphery of the thermistor 10. As a result, the axial length of the stator can be restrained from increasing, and the size of the stator can be restrained from increasing.

Besides, in the present embodiment of the invention, the position of the thermistor 10 in the circumferential direction of the stator is the position between the coils 22 that are adjacent to each other in the circumferential direction of the stator. Thus, the temperature of the coils 22 can be measured at the position between the coils 22 where a high temperature tends to be reached due to the severest thermal condition. Furthermore, the element portion 10a at the tip portion of the thermistor 10 is opposed to the position between the adjacent coils 22 in the axial direction of the stator. Thus, even in the case where the gap between the adjacent coils 22 is narrow and it is difficult to insert the element portion 10a of the thermistor 10 into the gap between the coils 22, the temperature of the coils 22 can be measured at a position close to a location where a high temperature tends to be reached due to the severest thermal condition.

Figure 5:
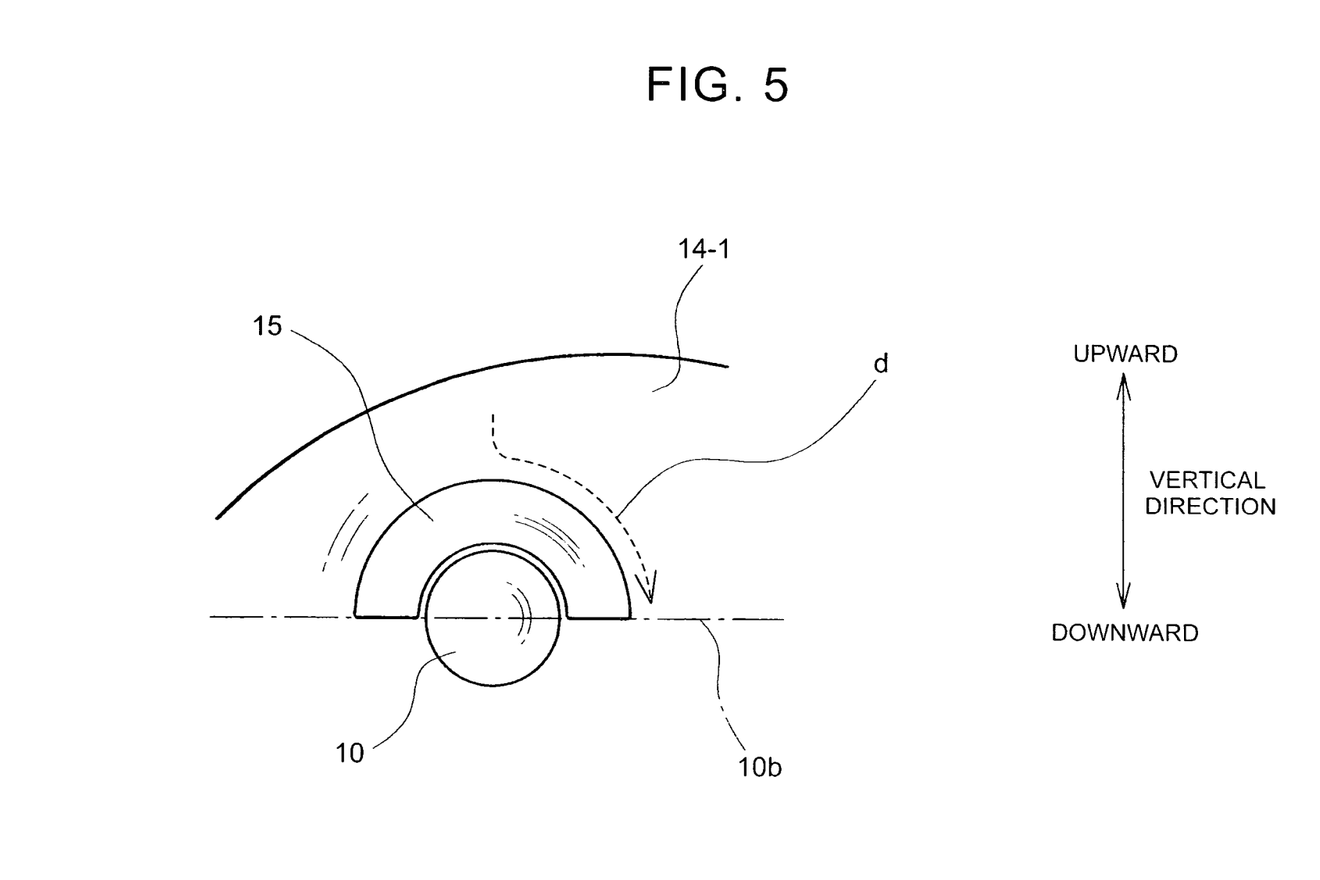
FIG. 5 is a view showing another schematic configuration as viewed from the axial direction of the stator for the rotary electric machine according to the embodiment of the invention.

In the foregoing embodiment of the invention, the bulge portion 15 is provided over the entire periphery of the thermistor 10. It should be noted, however, that the bulge portion 15 is not absolutely required to be provided over the entire periphery of the thermistor 10 in the present embodiment of the invention as shown in, for example, FIG. 5. In an example of FIG. 5, the bulge portion 15 is partially provided on a region that is located vertically above a horizontal plane 10b that passes through a central axis of the thermistor, around the thermistor 10. In this case as well, as indicated by an arrow d of FIG. 5, the cooling oil flows vertically downward along the outer peripheral surface of the bulge portion 15, so the bulge portion 15 can restrain the cooling oil from falling on the thermistor 10. In this manner, the bulge portion 15 is provided on the region that is located at least upstream with respect to the flow of the cooling oil around the thermistor 10, so the cooling oil can be restrained from falling on the thermistor 10.

Figure 6:
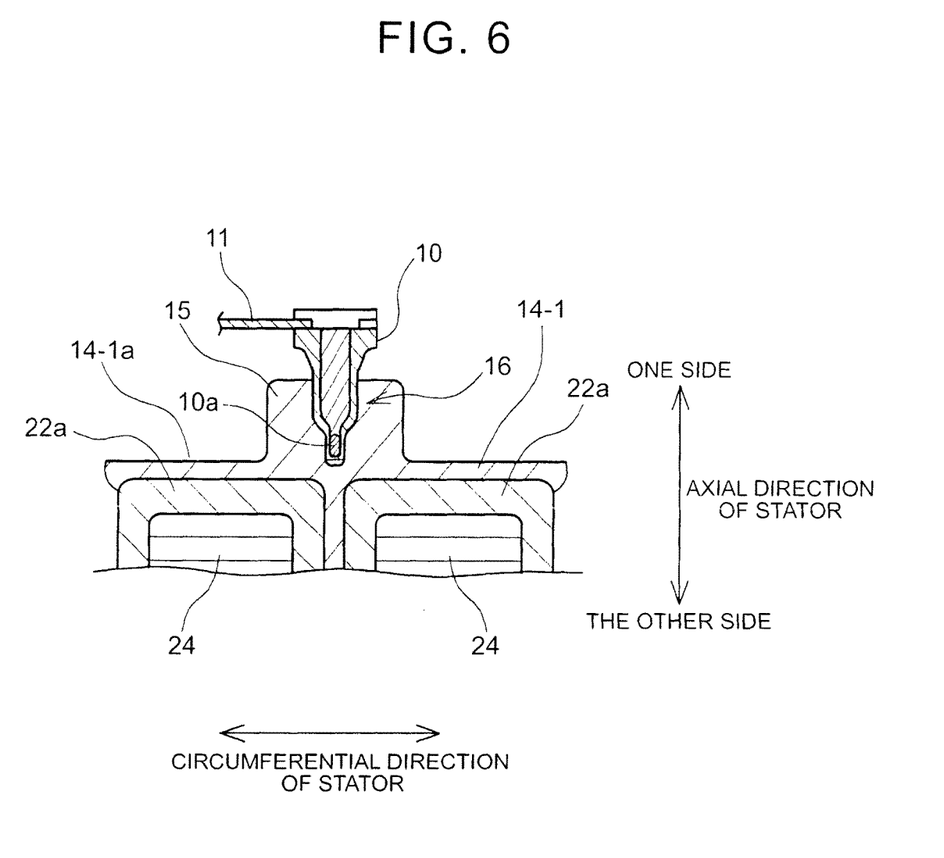
FIG. 6 is a cross-sectional view showing another schematic configuration along the circumferential direction of the stator for the rotary electric machine according to the embodiment of the invention.

In the foregoing embodiment of the invention, the element portion at the tip portion of the thermistor 10 is located inside one end surface in the axial direction of the stator (the region other than the bulge portion 15) 14-1a with respect to the axial direction of the stator. It should be noted, however, that when the mold resin 14-1 is thin in the axial direction of the stator, the element portion 10a at the tip portion of the thermistor 10 may be located outside (on one side in the axial direction of the stator) one end surface in the axial direction of the stator (the region other than the bulge portion 15) 14-1a with respect to the axial direction of the stator, in the present embodiment of the invention as shown in, for example, FIG. 6.

In the foregoing embodiment of the invention, the thermistor 10 is fixed to the housing 20 by the bracket 11. It should be noted, however, that the thermistor 10 may be fixed to the mold resin 14-1, for example, by inserting the thermistor 10 into the insertion hole 16 through press-fitting, filling the gap between the thermistor 10 inserted in the insertion hole 16 and the mold resin 14-1 (the inner peripheral surface of the insertion hole 16) with a filling material (e.g., varnish or the like), or the like in the present embodiment of the invention.

In the foregoing embodiment of the invention, the bulge portion 15 is molded integrally with the mold resin 14-1. It should be noted, however, that the bulge portion 15 can be molded separately from the mold resin 14-1 and bonded to the mold resin 14-1 in the present embodiment of the invention.

In the foregoing embodiment of the invention, the thermistor 10 is arranged vertically above the central axis 30a of the stator. It should be noted, however, that the thermistor 10 can also be arranged vertically below the central axis 30a of the stator in the present embodiment of the invention.

While the mode for carrying out the invention has been described above, it is obvious that the invention is not limited at all to this embodiment thereof, and that the invention can be carried out in various manners without departing from the gist thereof.

What is claimed is:

1. A stator for a rotary electric machine, the stator comprising:
    a stator core;
    a coil that is wound around the stator core;
    a mold portion that includes a coil end portion, the coil end portion projecting outward from the stator core of the coil in an axial direction of the stator, a bulge portion being provided at an end portion of the mold portion in the axial direction of the stator, the mold portion being configured to mold the coil end portion, and a liquid cooling medium being supplied from a cooling medium supply member to an outer peripheral surface of the mold portion; and
    a temperature sensor that is provided at the end portion of the mold portion in the axial direction of the stator, the temperature sensor being configured to measure a temperature of the coil, wherein
    the bulge portion is provided bulging outward in the axial direction of the stator to surround at least part of a periphery of the temperature sensor,
    the bulge portion is configured to restrain the liquid cooling medium from being supplied to the temperature sensor, and
    the bulge portion is molded integrally with the mold portion, wherein the stator core includes a plurality of teeth that are arranged apart from one another in a circumferential direction of the stator, and the coil is wound around each of the teeth of the stator core in a concentrated manner, wherein a position of the bulge portion in the circumferential direction of the stator is a position between the coils that are adjacent to each other in the circumferential direction of the stator, and wherein the bulge portion has an insertion hole that opens to one end surface in the axial direction of the stator, the temperature sensor being disposed in the insertion hole.

2. The stator for the rotary electric machine according to claim 1, wherein the temperature sensor includes an element portion at a tip portion of the temperature sensor, and the element portion is located inside an end surface of the mold portion in the axial direction of the stator.

3. The stator for the rotary electric machine according to claim 1, wherein the temperature sensor includes an element portion at a tip portion of the temperature sensor, and the element portion is located outside an end surface of the mold portion in the axial direction of the stator.

4. The stator for the rotary electric machine according to claim 1, wherein the temperature sensor includes an element portion at a tip portion of the temperature sensor, and the temperature sensor is located vertically above a central axis of the stator.

5. The stator for the rotary electric machine according to claim 1, wherein a position of the temperature sensor in the circumferential direction of the stator is equivalent to a position between the coils that are adjacent to each other in the circumferential direction of the stator.

6. The stator for the rotary electric machine according to claim 1, wherein the mold portion has an insertion hole that opens to one end surface in the axial direction of the stator, the temperature sensor is disposed in the insertion hole, and in the mold portion, the bulge portion is provided on at least a region that is located vertically above a horizontal plane that passes through a central axis of the temperature sensor.

* * * * *